United States Patent [19]

Darmon et al.

[11] 3,719,816

[45] March 6, 1973

[54] SYSTEM FOR MONITORING THE DECODING OF AN ADDRESS

[75] Inventors: Jacques Darmon, Sceaux; Philippe Coffre, Paris, both of France

[73] Assignee: Jeumont-Schneider, Paris, France

[22] Filed: June 25, 1971

[21] Appl. No.: 156,834

[30] Foreign Application Priority Data

June 25, 1970 France ................................7023519

[52] U.S. Cl. ........................235/153 AM, 340/166 R

[51] Int. Cl. ............................................H03k 13/34

[58] Field of Search .........340/146.1 AB, 166, 147 R; 235/153 AM

[56] References Cited

UNITED STATES PATENTS

| | | | |
|---|---|---|---|
| 3,049,692 | 8/1962 | Hunt | 340/146.1 |
| 3,008,129 | 11/1961 | Katz | 340/146.1 |
| 3,047,843 | 7/1962 | Katz | 340/146.1 |
| 3,237,157 | 2/1966 | Higby, Jr. | 340/146.1 |
| 3,543,236 | 11/1970 | Sibley | 340/146.1 |
| 3,601,801 | 8/1971 | Sauvan | 340/166 |

*Primary Examiner*—Charles E. Atkinson
*Attorney*—Raymond A. Robic

[57] ABSTRACT

A system for checking the decoding of an address previously encoded in the form of a group of N bits called input bits. The system performs, on one hand, a re-encoding of such address in the form of N output bits identical to the N input bits, and in the form of their complementary bits $\overline{N}$, and, on the other hand, compares the identity and/or complementarity of the input and output bits. The system comprises a first arrangement of $2^N$ relays each having a single contact, a group of n diodes ($D_1$, $D_2$, etc.) per contact, a group of *n* re-encoding matrices ($M_1$, $M_2$ etc.), a second arrangement of 2N relays each having a contact, and means for comparing the identity and/or the complementarity of the input and output bits.

1 Claim, 1 Drawing Figure

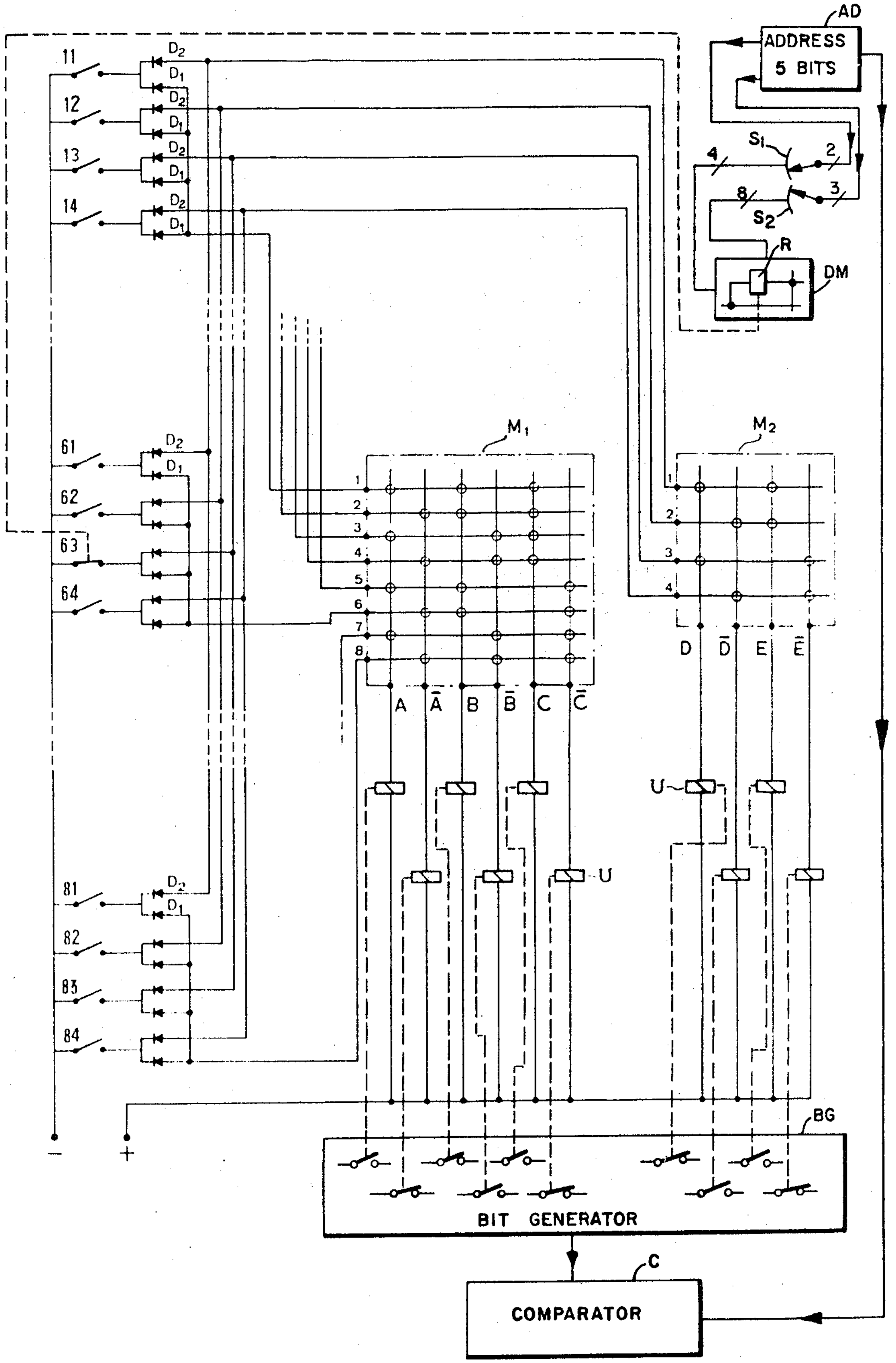
AD
ADDRESS
5 BITS
S1
S2
R
DM
M1
M2
D
D̄
E
Ē
A
Ā
B
B̄
C
C̄
U
BG
BIT GENERATOR
C
COMPARATOR
−
+

SYSTEM FOR MONITORING THE DECODING OF AN ADDRESS

This invention relates to a system for monitoring the decoding of an address.

In data transmission, particularly when an address has to be encoded and then decoded, it may be necessary to increase the reliability of the equipment by the use of a monitoring system whereby the user can check that one and only one address has been decoded and that the correct address was transmitted.

The address being encoded, for example, in the form of N bits, the latter are generally separated into two groups: a group of $m$ bits or bits of low weight, and a group of $p$ bits or bits of high weight, N being equal to $m + p$, and $m$ and $p$ being integers.

Decoding may be carried out by a known method using two selectors: a first selector having $m$ inputs and $2^m$ outputs, a second selector having $p$ inputs and $2^p$ outputs, and by means of a decoding matrix having $2^p$ columns and $2^m$ lines forming the control network of $2^{m+p}$ relays, i.e., feeding a single relay per column and per line.

The present invention relates to a system for monitoring the decoding of an address irrespective of whether decoding has been carried out by the above method or by any other method.

The principle of this invention is firstly to re-encode the address in two forms of bits: bits identical to the initial bits and bits which are complementary thereto, and secondly to compare the identity and/or complementarity of these bits.

This method does not appear to have been used hitherto, since current practice is to assume that the decoding system has operated correctly, and hence the danger of errors.

The system according to the invention obviates this risk. It is characterized in that it comprises:

a. one contact per relay winding, actuated by the relay winding, each contact being connected by one of its terminals to the negative pole of a d.c. source and by the other terminal to the cathodes of $n$ semiconductor devices of dissymmetrical conductivity $D_1, D_2, \ldots D_n$, such as diodes ($n$ being an integer equal to at least one), b. $n$ diode-type re-encoding matrices $M_1, M_2, \ldots M_n$, the matrix $M_1$ having $2^q1$ lines and $2q_1$ columns, the matrix $M_2$ having $2^q2$ lines and $2q_2$ columns, etc., the matrix $M_n$ having $2^qn$ lines and $2q_n$ columns, $q_1, q_2 \ldots q_n$ being integers so selected that their sum is equal to $m + p$; the diodes being so disposed between the lines and the columns of these $n$ diode matrices that their cathodes are always connected to the lines and so that the 2 ($m + p$) ends of the columns respectively reproduce each of the $m + p$ input bits and each of the $m + p$ complementary bits; the lines of the $n$ matrices $M_1, M_2 \ldots M_n$ being connected to the anodes of the devices $D_1, D_2 \ldots D_n$ as follows: the $2^{m+p}$ contacts of the relays of the decoding matrix are divided into $2^q1$ groups (i.e., as many groups as there are lines in the matrix $M_1$) and the contacts of each of these groups are allocated a first reference X, namely 1 in the case of the first group, 2 in the case of the second group and so on up to $2^q1$; each of these $2^q1$ groups is in turn subdivided into $2^q2$ groups (i.e. as many groups as there are lines in the matrix $M_2$) and the contacts of each of these sub-groups are allocated a second reference Y, namely 1 in the case of the first sub-group, 2 in the case of the second sub-group, and so on up to $2^q2$; the procedure continuing in this way as far as the last subdivision into $2^q n$ groups corresponding to the number of lines in the matrix $M_n$ and the contacts are allocated a last reference W ranging from 1 to $2^qn$; each contact thus being characterized by a sequence of $n$ references X Y . . . W, the anode of the device $D_1$ being connected to the line of order X in the matrix $M_1$, the anode of the device $D_2$ being connected to the line of order Y of the matrix $M_2$, etc., and the anode of the device $D_n$ being connected to the line of order W in the matrix $M_n$, c. a second group of 2 ($m + p$) relays with one contact per relay winding, the windings of which are connected one by one between each end of the columns of the n re-encoding matrices and the positive pole of the d.c. source, the state of each contact representing an output bit, and d. comparison means connected to the contacts of the second group of relays to check the identity and/or complementarity of the output bits in relation to the input bits.

In a first variant according to the invention, the terminals of the d.c. source may be reversed, all the diodes and all the dissymmetrical conductivity semi-conductor devices $D_1, D_2, \ldots D_n$ being connected in the opposite direction.

In a second variant according to the invention the 2 ($m + p$) relays situated at the outputs of the re-encoding matrix columns may be replaced by semi-conductor devices brought into the conductive or cut-off state.

The invention will be more readily understood from the following exemplified embodiment, the circuit diagram of which is shown in the accompanying single FIGURE.

This example, which in order to clarify the explanation has been selected from the most simple, corresponds to $m = 2, p = 3, n = 2, q_1 = 3, q_2 = 2$. We have $q_1 + q_2 = m + p =$ selector and there are only two re-encoding matrices $M_1$ and $M_2$. The address being encoded is illustrated by block AD and is composed, according to the example chosen, of five bits since $m + p = 5$. Such address is separated into two groups as mentioned previously, a first group $m = 2$ of bits of high weight, and a second group $p = 3$ of bits of low weight. Decoding is carried out using a known decoding system including a first selector $S_1$ having 2 inputs and $2^2$ or 4 outputs, a second selector $S_2$ having 3 inputs and $2^3$ or 8 outputs, and a decoding matrix DM the lines of which are connected to the outputs of selector $S_1$ and the columns of which are connected to the outputs of selector $S_2$. The decoding matrix DM has four lines and eight columns and forms a control network including $2^{m+p}$ or 32 relays R (only one illustrated) operating unidirectional contacts which have been given references formed from a two digit numeral; the 32 unidirectional contacts have been divided into eight groups, i.e., as many groups as there are lines in the diode matrix $M_1$. The first group has been allocated the digit 1 etc., the sixth group has been allocated the digit 6 etc., and the eighth the digit 8. These digits appear on the left in the numerical references of each contact. Each group has then been subdivided into four subgroups since there are four lines in the diode matrix $M_2$, and the second digit of the unidirectional contact reference indicates the order of each of these sub-groups.

All the contacts are connected by one of their terminals to the negative terminal — of a d.c. source. The other terminal is connected to the cathodes of two diodes $D_1$ and $D_2$. The first diode re-encoding matrix $M_1$, which comprises eight lines and six columns, has its lines (bearing the references 1 to 8) connected to the anodes of the diodes $D_1$ associated with the contacts whose first digit is the same. For example line 6 is connected to the anodes of the diodes $D_1$ of the contacts 61, 62, 63, 64.

The second diode matrix $M_2$, which comprises four lines and four columns, has its lines (bearing the references 1 to 4) connected to the anodes of the diodes $D_2$ associated with the contacts whose second digit is the same. For example, line 2 is connected to the anodes of the diodes $D_2$ of the contacts 12, 22, etc. up to 62, etc. 82.

The diode matrices $M_1$ and $M_2$ have their diodes disposed in known manner between their lines and their columns. These diodes are represented in the drawing by a small circle. Each line and column intersection surrounded by such a circle indicates that a diode is connected between the said line and the said column, its cathode being connected to said line and its anode to said column. The column ends having the references $\bar{A}$, $\bar{B}$, $\bar{C}$, $\bar{D}$, $\bar{E}$ correspond to output bits identical to the five input bits. The ends marked A, B, C, D, E correspond to the five bits complementary of the latter. Each of these ends is connected to the positive pole + of the d.c. source via a relay U having a unidirectional contact. It is already known to use these contacts in a comparison system to check the identity or the complementarity of the input and output bits during the entire period of information exchange concerning the encoded addresses. Such a system, therefore, is shown in the drawing in a schematical manner by means of a bit generator BG and a comparator C.

In the system selected, for example, only the relay of the decoding matrix whose contact has the reference 63 is fed and in the drawing only said contact 63 is closed. In the matrix $M_1$, the relays U respectively corresponding to the outputs $\bar{A}$, B and $\bar{C}$ are fed. Also, in the matrix $M_2$, the relays U corresponding respectively to the outputs D and E are fed. Consequently, only the unidirectional contacts of the said relays U are closed and these contacts restore to the comparison systems the bits corres-ponding to the input bits and to the bits complementary of the latter. A very effective decoding check can thus be carried out.

The reliability of such a system for monitoring or checking the decoding of an address is then very high.

In a first variant according to the invention, the two poles + and − of the d.c. source may be reversed and all the diodes $D_1$ $D_2$ and the diodes of the matrices $M_1$ and $M_2$ may be connected in the opposite direction.

In a second variant, the ten relays U situated at the outputs of the matrices $M_1$ and $M_2$ may be replaced by semiconductor devices brought into the conductive or cut-off state, for example transistors.

The invention may be used, for example, in data transmission, remote control or remote monitoring equipment.

I claim:

1. A system for checking the decoding of an address previously encoded in the form of a group of $m + p$ bits called input bits wherein $m$ and $p$ are two integers, and decoded by means of two selectors and a decoding matrix having $2^p$ columns and $2^m$ lines forming a control network of $2^{m+p}$ relay windings, said system being characterized in that it comprises:

a. one contact per relay winding, actuated by the said relay winding, each contact being connected by one of its terminals to the negative pole of a d.c. source and by the other terminal to the cathodes of $n$ semiconductor devices of dissymmetrical conductivity $D_1, D_2, \ldots D_n$, $n$ being an integer equal to at least one;

b. $n$ diode-type re-encoding matrices $M_1, M_2 \ldots M_n$, the matrix $M_1$ having $2^{q}1$ lines and $2q_1$ columns, the matrix $M_2$ having $2^{q}2$ lines and $2q_2$ columns, etc., the matrix $M_n$ having $2^{q}n$ lines and $2q_n$ columns, $q_1, q_2 \ldots q_n$ being integers so selected that their sum is equal to $m + p$; the diodes being so disposed between the lines and the columns of said $n$ diode matrices that their cathodes are always connected to the lines and so that the $2(m + p)$ ends of the columns respectively reproduce each of the $m + p$ input bits and each of the $m + p$ complementary bits; the lines of the $n$ matrices $M_1, M_2 \ldots M_n$ being connected to the anodes of the devices $D_1, D_2 \ldots D_n$ as follows: the $2^{m+p}$ contacts of the relays of the decoding matrix are divided into $2^{q}1$ groups and the contacts of each of these groups are allocated a first reference X, namely 1 in the case of the first group, 2 in the case of the second group and so on up to $2^{q}1$; each of these $2^{q}1$ groups is in turn subdivided into $2^{q}2$ groups and the contacts of each of these sub-groups are allocated a second reference Y, namely 1 in the case of the first sub-group, 2 in the case of the second sub-group, and so on up to $2^{q}2$; the procedure continuing in this way as far as the last subdivision into $2^{q}n$ groups corresponding to the number of lines in the matrix $M_n$ and the contacts are allocated a last reference W ranging from 1 to $2^{q}n$; each contact thus being characterized by a sequence of $n$ reference X Y . . . W, the anode of the device $D_1$ being connected to the line of order X in the matrix $M_1$, the anode of the device $D_2$ being connected to the line of order Y of the matrix $M_2$, etc., and the anode of the device $D_n$ being connected to the line of order W in the matrix $M_n$;

c. a second group of $2(m + p)$ relay windings, with one contact per relay winding, the relay windings being connected one by one between each end of the columns of the $n$ re-encoding matrices and the positive pole of the d.c. source, the state of each contact representing an output bit; and d. comparison means connected to the contacts of the said second group of relay windings to check the identity and/or complementarity of the output bits in relation to the input bits.

* * * * *